United States Patent
Yang

(10) Patent No.: US 12,375,681 B2
(45) Date of Patent: Jul. 29, 2025

(54) DEVICE AND METHOD FOR CODING VIDEO DATA

(71) Applicant: SHARP KABUSHIKI KAISHA, Sakai (JP)

(72) Inventor: Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/036,097

(22) PCT Filed: Nov. 15, 2021

(86) PCT No.: PCT/CN2021/130730
§ 371 (c)(1),
(2) Date: May 9, 2023

(87) PCT Pub. No.: WO2022/105721
PCT Pub. Date: May 27, 2022

(65) Prior Publication Data
US 2024/0022728 A1  Jan. 18, 2024

Related U.S. Application Data

(60) Provisional application No. 63/134,937, filed on Jan. 7, 2021, provisional application No. 63/114,985, filed on Nov. 17, 2020.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/176* (2014.11); *H04N 19/46* (2014.11)

(58) Field of Classification Search
CPC .............. H04N 19/105; H04N 19/119; H04N 19/137; H04N 19/176; H04N 19/46; H04N 19/54
(Continued)

(56) References Cited

U.S. PATENT DOCUMENTS

| | | | |
|---|---|---|---|
| 11,272,179 B2* | 3/2022 | Yang | H04N 19/105 |
| 11,272,199 B2* | 3/2022 | Teng | H04N 19/52 |
| 2021/0058617 A1* | 2/2021 | Reuze | H04N 19/537 |

FOREIGN PATENT DOCUMENTS

| | | | | |
|---|---|---|---|---|
| CN | 111316648 B | * | 6/2024 | ........... H04N 19/105 |
| KR | 20200145750 A | * | 12/2020 | ........... H04N 19/107 |

(Continued)

OTHER PUBLICATIONS

Jianle Chen et al., "Algorithm description for Versatile Video Coding and Test Model 10 (VTM 10)", JVET-S2002-v2, Joint Video Experts Team (JVET) of ITU-T SG 16 WP 3 and ISO/IEC JTC 1/SC 29/WG 11, 19th Meeting: by teleconference, Jun. 22-Jul. 1, 2020, Oct. 10, 2020(Oct. 10, 2020) section 3.4.

(Continued)

*Primary Examiner* — Behrooz M Senfi
(74) *Attorney, Agent, or Firm* — ScienBiziP, P.C.

(57) ABSTRACT

A method of decoding video data by an electronic device is provided. The electronic device determines, according to the video data, a block unit from an image frame and a split line of the block unit. The electronic device determines first motion information and second motion information according to the video data. The electronic device determines a first predicted block of the block unit based on the first motion information by an affine model and determines a second predicted block of the block unit based on the second motion information. The block unit is predicted by combining the first predicted block and the second predicted block based on the split line.

20 Claims, 6 Drawing Sheets

(51) Int. Cl.
*H04N 19/176* (2014.01)
*H04N 19/46* (2014.01)

(58) Field of Classification Search
USPC .................................................. 375/240.02
See application file for complete search history.

(56) References Cited

FOREIGN PATENT DOCUMENTS

| WO | 2020114405 A1 | 6/2020 | |
|---|---|---|---|
| WO | 2020176865 A1 | 9/2020 | |
| WO | WO-2022082053 A1 * | 4/2022 | ........... H04N 19/176 |

OTHER PUBLICATIONS

Jianle Chen et al., "Algorithm description for Versatile Video Coding and Test Model 5 (VTM 5)", JVET-N1002-v2, Joint Video Experts Team (JVET) of ITU-T SG 16 WP 3 and ISO/IEC JTC 1/SC 29/WG 11, 14th Meeting: Geneva, CH, Mar. 19-27, 2019, Jun. 11, 2019(Jun. 11, 2019), section 3.4.

Yanzhuo Ma et al., "GPM merge list construction modification", JVET-R0368-v2, Joint Video Experts Team (JVET) of ITU-T SG 16 WP 3 and ISO/IEC JTC 1/SC 29/WG 11, 18th Meeting: by teleconference, Apr. 15-24, 2020, Apr. 17, 2020(Apr. 17, 2020).

Telecommunication Standardization Sector of ITU, "Versatile video coding", Recommendation ITU-T H.266, (Aug. 2020).

* cited by examiner

DEVICE AND METHOD FOR CODING VIDEO DATA

CROSS-REFERENCE TO RELATED APPLICATION(S)

The present application is a National Stage Application of International Patent Application Serial No. PCT/CN2021/130730, filed on Nov. 15, 2021, entitled "Device and Method for Coding Video Data", which claims the benefit of and priority to U.S. Provisional patent application Ser. No. 63/114,985, filed on Nov. 17, 2020, entitled "Affine Geometric Prediction Generation", and U.S. Provisional Patent application Ser. No. 63/134,937, filed on Jan. 7, 2021, entitled "Signaling of Subblock Geometric Partitioning Mode". The contents of all of the above-referenced applications are hereby fully incorporated by reference into the present disclosure.

FIELD

The present disclosure is generally related to video coding and, more specifically, to techniques for sub-block geometric partitioning mode (sbGPM).

BACKGROUND

Geometric partitioning mode (GPM) is a coding tool in a video coding method. In the GPM, the encoder may select two of a plurality of merge candidates for predicting a block unit in an image frame of video data and provide two merge indices into a bitstream for the decoder to recognize the selected merge candidates.

However, in the GPM, only a translation motion model is applied, while in the real world, there are many kinds of motion, e.g., zoom in/out, rotation, perspective motions, and other irregular motions. Thus, the current GPM may be an incomplete tool so that the current GPM may not be used to predict a block having several kinds of motion.

SUMMARY

The present disclosure is directed to a device and method for predicting a block unit in an image frame by using two mode candidates including an affine candidate based on the GPM.

In a first aspect of the present disclosure, a method of decoding video data and an electronic device for performing the method are provided. The method comprises determining a block unit from an image frame according to the video data; determining a split line of the block unit according to the video data; determining first motion information and second motion information according to the vide data; determining a first predicted block of the block unit based on the first motion information by an affine model; determining a second predicted block of the block unit based on the second motion information; and predicting the block unit by combining the first predicted block and the second predicted block based on the split line.

In an implementation of the first aspect, the first motion information and the second motion information are determined from a candidate list including at least one of an affine candidate list, an inter merge candidate list, and a motion vector prediction (MVP) candidate list; the affine candidate list includes at least one of a plurality of affine merge candidates and a plurality of affine motion vector prediction candidates each used to predict based on the affine model; the inter merge candidate list includes at least one of a plurality of regular merge candidates; and the MVP candidate list includes at least one of a plurality of MVP candidates.

In another implementation of the first aspect, the first motion information and the second motion information are determined from a candidate list only including an affine candidate list having at least one of a plurality of affine merge candidates and a plurality of affine motion vector prediction candidates each used to predict based on the affine model.

In another implementation of the first aspect, the first motion information includes at least two first control point motion vectors (CPMVs) derived based on a plurality of neighboring blocks neighboring the block unit; and the first predicted block of the block unit is determined by dividing the block unit into a plurality of sub-blocks and predicting the plurality of sub-blocks based on the at least two first CPMVs by the affine model.

In another implementation of the first aspect, the second motion information includes at least two second CPMVs derived based on the plurality of neighboring blocks; and the second predicted block of the block unit is determined by predicting the plurality of sub-blocks based on the at least two second CPMVs by the affine model.

An implementation of the first aspect further comprises determining, from the video data, a prediction mode flag indicating a geometric prediction mode (GPM) is applied on the block unit; determining, based on the prediction mode flag, whether a block flag is included in the video data; and determining, based on the block flag, whether a sub-block GPM is applied on the block unit.

An implementation of the first aspect further comprises determining, from the video data, a sub-block flag indicating a sub-block merge mode is applied on the block unit; determining, based on the sub-block flag, whether a sub-block GPM flag is included in the video data; and determining, based on the sub-block GPM flag, whether a sub-block GPM is applied on the block unit.

In a second aspect of the present disclosure, a method for decoding video data and an electronic device for performing the method are provided. The method comprises determining a block unit from an image frame according to the video data; determining a split line of the block unit according to the video data; determining a plurality of candidate modes including a sub-block mode used to predict based on an affine model; select two prediction modes from the plurality of candidate modes; determining two predicted blocks based on the two prediction modes, wherein the block unit is predicted to generate one of the two predicted blocks based on the affine model when the sub-block mode is selected as one of the two prediction modes; and predicting the block unit by combining the two predicted blocks based on the split line.

In an implementation of the second aspect, the plurality of candidate modes is included in a candidate list including at least one of an affine candidate list, an inter merge candidate list, and a motion vector prediction (MVP) candidate list; the sub-block mode is included in the affine candidate list; the inter merge candidate list includes at least one of a plurality of regular merge candidates; and the MVP candidate list includes at least one of a plurality of MVP candidates.

In another implementation of the second aspect, the affine candidate list includes at least one of a plurality of affine merge candidates and a plurality of affine motion vector prediction candidates each used to predict based on the affine model.

In another implementation of the second aspect, the sub-block mode includes at least two first control point motion vectors (CPMVs) derived based on a plurality of neighboring blocks neighboring the block unit; and the one of the two predicted blocks is determined by dividing the block unit into a plurality of sub-blocks and predicting the plurality of sub-blocks based on the at least two first CPMVs by the affine model.

An implementation of the second aspect further comprises determining, from the video data, a prediction mode flag indicating a geometric prediction mode (GPM) is applied on the block unit; determining, based on the prediction mode flag, whether a block flag is included in the video data; and determining, based on the block flag, whether the sub-block mode is included in the plurality of candidate modes.

An implementation of the second aspect further comprises determining, from the video data, a sub-block flag indicating a sub-block merge mode is applied on the block unit; determining, based on the sub-block flag, whether a sub-block GPM flag is included in the video data; and determining, based on the sub-block GPM flag, whether the sub-block mode is included in the plurality of candidate modes, wherein the sub-block mode is a sub-block GPM.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
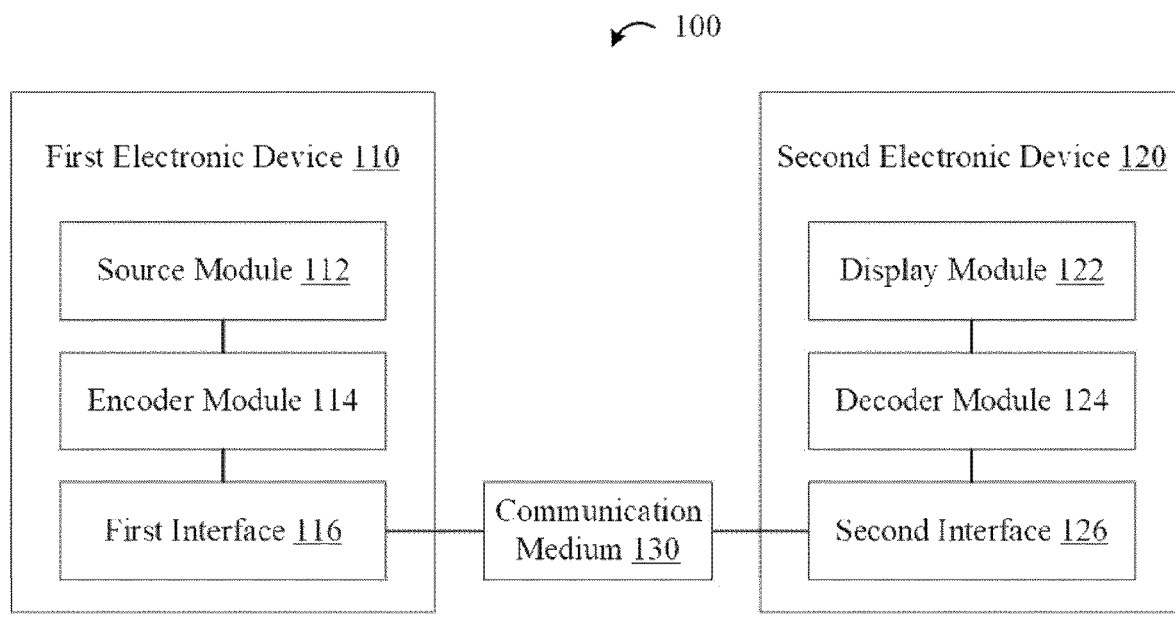
FIG. 1 illustrates a block diagram of a system configured to encode and decode video data according to an implementation of the present disclosure.

The following disclosure contains specific information pertaining to implementations in the present disclosure. The figures and the corresponding detailed disclosure are directed to example implementations. However, the present disclosure is not limited to these example implementations.

Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details such as functional entities, techniques, protocols, and standards are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer readable medium includes, but is not limited to, random-access memory (RANI), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, Wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in other implementations. The display module 122 may include a high-definition display or an ultra-high-definition display.

Figure 2:
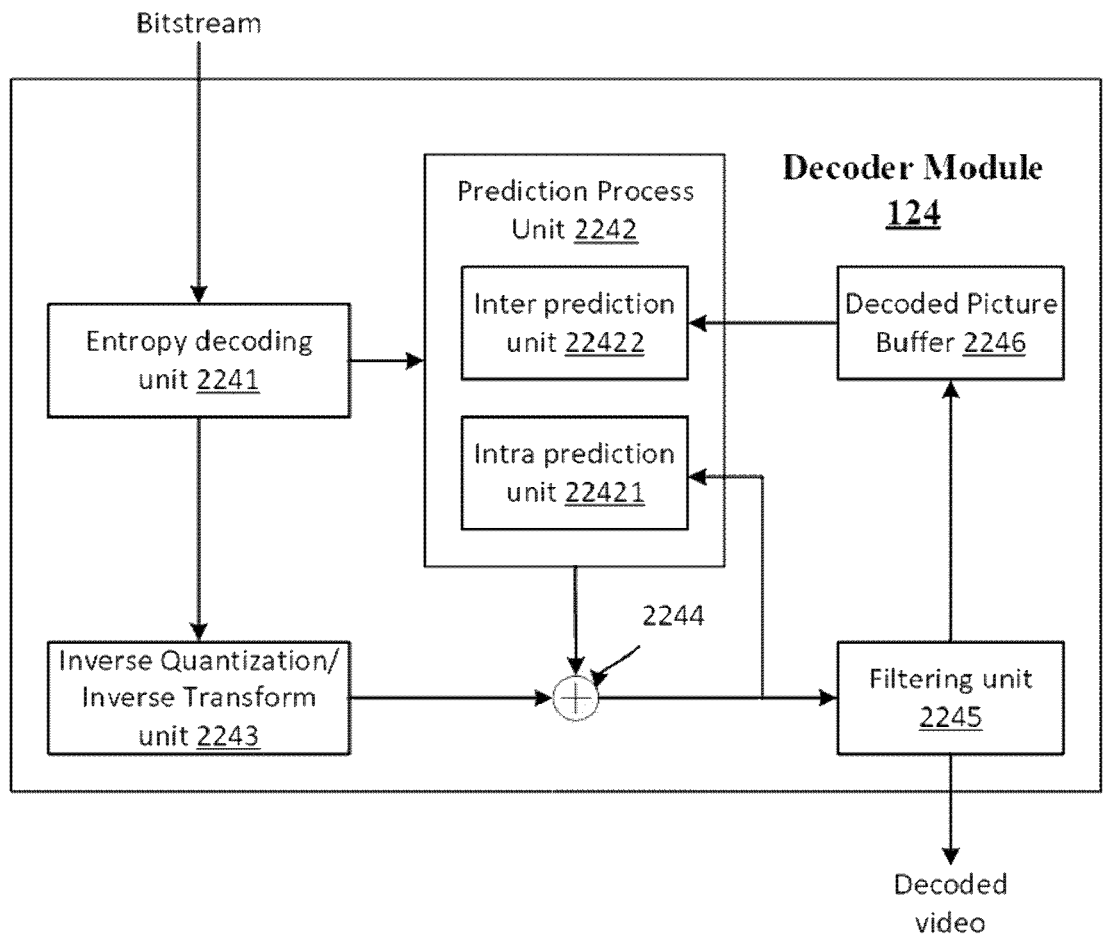
FIG. 2 illustrates a block diagram of the decoder module of the second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements such as motion vectors, intra modes, partition information, and other syntax information from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal dependent transform, Karhunen-Loeve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
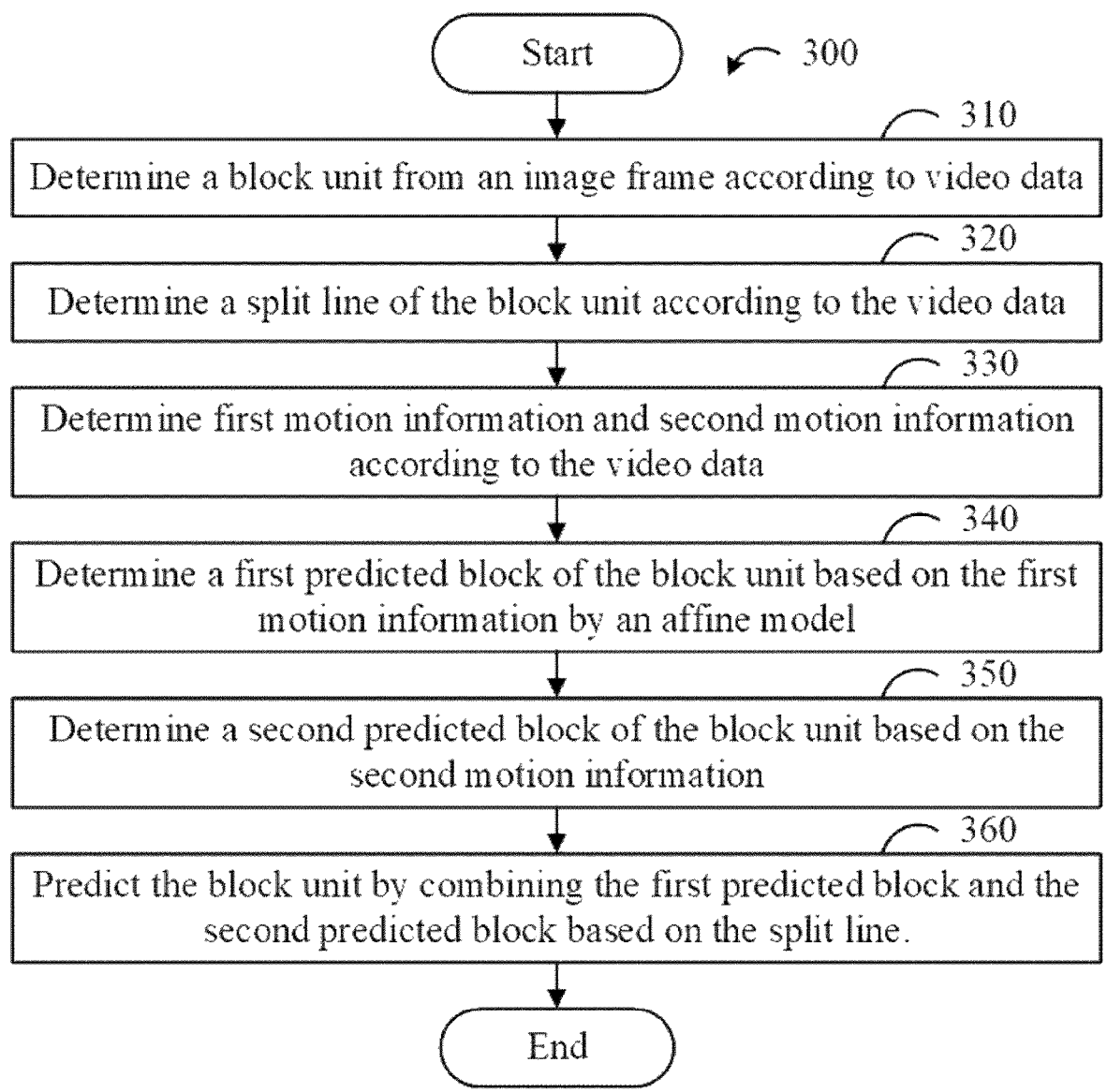
FIG. 3 illustrates a flowchart of a method for decoding video data by an electronic device according to an implementation of the present disclosure.

FIG. 3 illustrates a flowchart of a method 300 for decoding video data by an electronic device according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or fewer blocks may be utilized without departing from the present disclosure.

At block 310, the decoder module 124 determines a block unit from an image frame according to video data. In some implementations, the video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The decoder module 124 may determine the image frame based on the bitstream and divide the image frame to determine the block unit according to a plurality of partition indications in the bitstream. For example, the decoder module 124 may divide the image frames to generate a plurality of coding tree units and may further divide one of the coding tree units to determine the block unit according to the partition indications (e.g., based on a video coding standard).

In some implementations, the entropy decoding unit 2241 may decode the bitstream to determine a plurality of prediction indications for the block unit and the decoder module 124 may further reconstruct the block unit based on the prediction indications. The prediction indications may include a plurality of flags and a plurality of indices.

At block 320, the decoder module 124 determines a split line of the block unit according to video data.

In some implementations, with reference to FIG. 2, the decoder module 124 may divide the block unit into a plurality of prediction areas based on the split line of the block unit.

In some implementations, the prediction indications may include a partition index of the block unit. The partition index may indicate the split line of the block unit. In some implementations, the partition index may indicate a partition angle index and a partition distance index when the partition index is a geometric partition index. The partition angle index may indicate a split angle of the split line, and the partition distance index may indicate a split distance between the split line and a center point of the block unit. Thus, the decoder module 124 may determine the split line based on the split angle and the split distance indicated by the partition index. In some implementations, the prediction indications of the bitstream may include the partition angle index and the partition distance index.

Figure 4A:
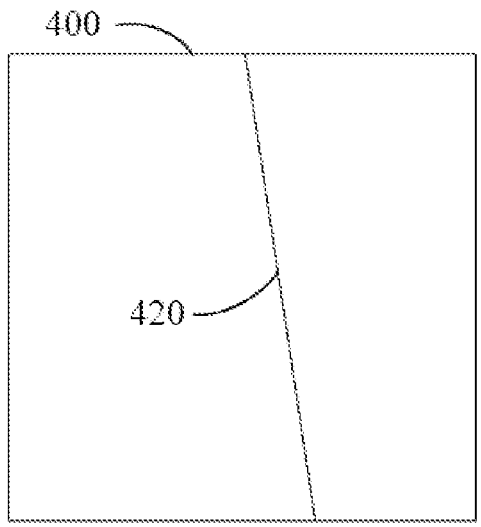
FIG. 4(a) is a schematic illustration of a block unit having a split line according to an implementation of the present disclosure.
Figure 4B:
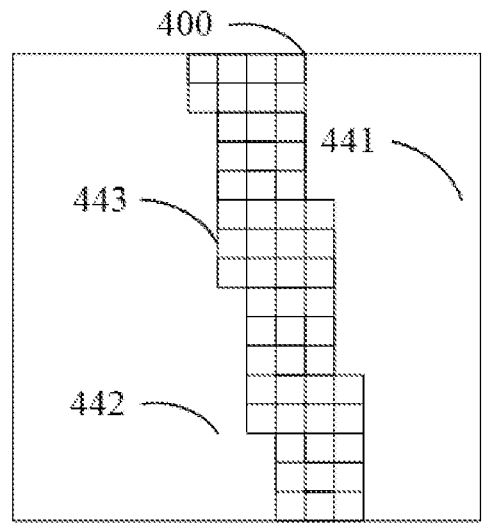
FIG. 4(b) is a schematic illustration of a block unit having different prediction areas separated based on the split line according to an implementation of the present disclosure.

FIG. 4(a) is a schematic illustration of a block unit having a split line according to an implementation of the present disclosure. In some implementations, the partition indications of the block unit 400 may indicate the split line 420. In some implementations, the block unit 400 may include a plurality of block components. Thus, the plurality of block components in the block unit 400 are divided into a plurality of prediction areas based on the split line 420. In one implementation, the number of the prediction areas may be equal to three. FIG. 4(b) is a schematic illustration of a block unit having different prediction areas separated based on the split line according to an implementation of the present disclosure. In the implementation, the decoder module 124 may divide the block unit 400 based on the split line 420 to determine the prediction areas 441-443. In the implementation, a third one of the prediction areas 443 covers the split line 420 and separates a first one of the prediction areas 441 from a second one of the prediction areas 442.

At block 330, the decoder module 124 determines first motion information and second motion information according to the video data.

In some implementations, with reference to FIG. 2 and FIGS. 4(a) and 4(b), the decoder module 124 may divide the block unit 400 into the plurality of prediction areas 441-443 based on the split line 420 of the block unit 400 and determine the first motion information and the second motion information for predicting the plurality of prediction areas 441-443.

In some implementations, the prediction indications may include a first motion candidate index and a second motion candidate index. In addition, the first motion candidate index and the second motion candidate index may be included in the bitstream. In some implementations, the first motion candidate index may indicate the first motion information in a candidate list having a plurality of candidate modes, and the second motion candidate index may indicate the second motion information in the candidate list. In some implementations, the candidate list includes at least one of an affine candidate list, an inter merge candidate list, and a motion vector prediction (MVP) candidate list. In some implementations, the affine candidate list may include at least one of a plurality of affine merge candidates and a plurality of affine MVP candidates, and each of the affine merge candidates and the affine MVP candidates may be regarded as a sub-block mode used to predict based on the affine model. In some implementations, the inter merge candidate list may include at least one of a plurality of regular merge candidates. In addition, the MVP candidate list may include at least one of a plurality of MVP candidates.

Figure 4C:
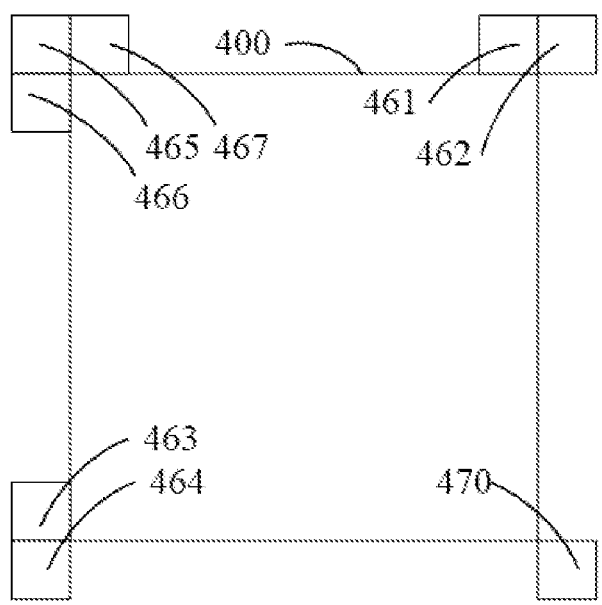
FIG. 4(c) is a schematic illustration of a block unit, a plurality of spatial neighboring blocks and a temporal neighboring block according to an implementation of the present disclosure.

In some implementations, the affine merge candidates may be determined based on the predicted information of the neighboring blocks. The affine merge candidate may be selected from a plurality of inherited affine merge candidates that are derived from a plurality of control point motion vectors (CPMVs) of the neighboring blocks, a plurality of constructed affine merge candidates that are derived by using a plurality of motion vectors of the neighboring blocks, and zero motion vectors. The inherited affine candidates may be derived from an affine motion model of the neighboring blocks. For example, the motion information of a specific one of the inherited affine candidates may include one of the CPMVs of a left neighboring block and/or an above neighboring block. The constructed affine candidates may be constructed by combining the motion information of the neighboring blocks. The motion information of the neighboring blocks is derived for the block unit 400 from a plurality of spatial neighboring blocks and a temporal neighboring block. FIG. 4(c) is a schematic illustration of a block unit 400, a plurality of spatial neighboring blocks 461-467 and a temporal neighboring block 470 according to an implementation of the present disclosure. The combination of three CPMVs constructs a six-parameter affine merge candidate and the combination of two CPMVs constructs a four-parameter affine merge candidate. To avoid a motion scaling process, if the reference indices of the neighboring blocks are different, the related combination of CPMVs is discarded.

In some implementations, the affine MVP candidates may be generated for the block unit. The affine MVP candidates may be selected from a plurality of inherited affine MVP candidates that are derived from the CPMVs of the neighboring blocks, a plurality of constructed affine MVP candidates that are derived by using a plurality of motion vectors of the neighboring blocks, the motion vectors of the neighboring blocks, and the zero motion vectors. The inherited affine MVP candidates may be derived from the affine motion model of the neighboring blocks. The constructed MVP candidates may be derived from the spatial neighboring blocks 461-467 shown in FIG. 4(c). After the inherited affine MVP candidates and the constructed MVP candidate are derived, the motion vectors of the neighboring blocks may be added, in order, to predict all CPMVs of the block unit.

In some implementations, the plurality of regular merge candidates in the inter merge candidate list may be selected from a plurality of spatial motion prediction modes of the neighboring blocks neighboring the block unit, a plurality of temporal motion prediction modes of a plurality of collocated blocks, history-based motion prediction modes stored in a first-in-first-out (FIFO) table, a plurality of pair-wise average motion prediction candidates, and at least one zero motion candidate. In some implementations, each of the regular merge candidates may indicate a reference frame and a reference vector derived from the neighboring blocks. In some implementations, a first reference list and a second reference list are set as L0 and L1, respectively, when the number of a plurality of reference lists each including a plurality of candidate frames may be equal to 2. In some implementations, each of the regular merge candidates may include a list flag for selecting one of the reference lists including the reference frame. For example, the second reference list L1 corresponding to a flag value different from 0 may not be used to predict the block unit 400 when the reference frame is included in the first reference list L0 indicated by the list flag equal to zero.

In some implementations, each of the MVP candidates in the MVP candidate list may correspond to an MVP index value. In some implementations, the motion vector may be determined based on a motion vector difference (MVD) and an MVP index indicating a corresponding one of the MVP candidates. The MVP index and the MVD may be included in the bitstream. In some implementations, the bitstream may further include at least one reference index when one of the MVP candidates is selected to predict the block unit. In the implementation, the at least one reference index may be used for determining at least one reference frame.

In some implementations, the MVP candidates and the regular merge candidates may be a plurality of advanced motion vector prediction (AMVP) candidates and the regular merge candidates in versatile video coding (VVC) or VVC test model (VTM).

In some implementations, the first motion information and the second motion information may be determined from the candidate list only including the affine candidate list having at least one of the plurality of affine merge candidates and the plurality of affine motion vector prediction candidates. Thus, the first motion information and the second motion information may be selected from the affine candidate list. In the implementation, each of the affine merge candidates and the affine MVP candidates is used to predict based on the affine model.

In some implementations, the candidate list includes at least one of the affine candidate list, the inter merge candidate list, and the MVP candidate list. Thus, the first information and the second information may be derived from the affine candidate list, the inter merge candidate list, and the MVP candidate list. When the first motion information is determined from the affine candidate list, the first motion information includes at least two first CPMVs derived based on the neighboring blocks neighboring the block unit. In addition, when the second motion information is determined from the affine candidate list, the second motion information includes at least two second CPMVs derived based on the neighboring blocks neighboring the block unit.

At block 340 of FIG. 3, the decoder module 124 determines a first predicted block of the block unit based on an affine model.

In some implementations, the first motion information is determined from one of the affine merge candidates and the affine MVP candidates, so the first motion information includes the at least two first CPMVs. In some implementations, the first predicted block is generated based on the at least two first CPMVs by the affine model when the decoder module 124 determines the first predicted block based on the first motion information. In some implementations, the affine model may include a four-parameter affine motion mode and a six-parameter affine motion mode. When the number of the at least two first CPMVs is equal to two, the first predicted block may be predicted by the four-parameter affine motion model and a plurality of motion vectors at sample location (x, y) in the block unit 400 is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases}$$

Wherein $(mv_{0x}, mv_{0y})$ is motion vector of a first one of the neighboring blocks, $(mv_{1x}, mv_{1y})$ is motion vector of a second one of the neighboring blocks, and W is a width of the block unit 400. In the implementation, the first neighboring block and the second neighboring block may be located at different corners of the block unit 400. In addition, when the number of the at least two first CPMVs is equal to three, the first predicted block may be predicted by the six-parameter affine motion model and the motion vectors at sample location (x, y) in the block unit 400 is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases}$$

Wherein $(mv_{2x}, mv_{2y})$ is motion vector of a third one of the neighboring blocks, and the first neighboring block, the second neighboring block, and the third neighboring block may be located at different corners of the block unit 400.

Figure 4D:
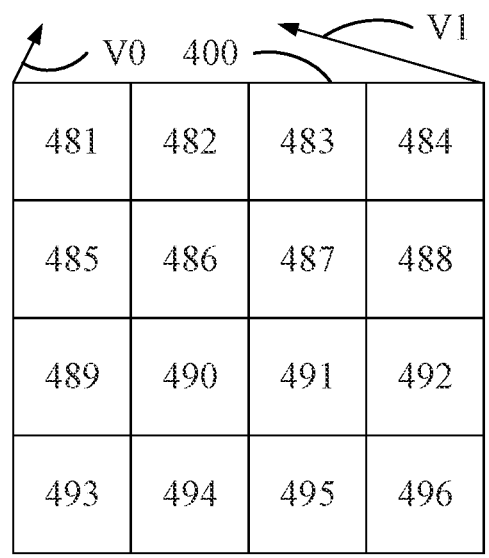
FIG. 4(d) is a schematic illustration of a block unit, a plurality of sub-blocks, and two CPMVs according to an implementation of the present disclosure.

In some implementations, with reference to FIG. 2, the decoder module 124 may divide the block unit into the sub-blocks and predict the sub-blocks based on the at least two first CPMVs by the affine model. FIG. 4(d) is a schematic illustration of a block unit 400, a plurality of sub-blocks 481-496, and two CPMVs V0 and V1 according to an implementation of the present disclosure. Each of the sub-blocks 481-496 may be identical to each other. In other words, the sizes of the sub-blocks 481-496 may be identical to each other, and the shapes of the sub-blocks 481-496 may be identical to each other. The number of the sub-blocks may be equal to an integer, such as four and sixteen. The motion vectors of the sub-blocks may be derived by the four-parameter affine motion model or the six-affine motion model. Thus, the decoder module 124 may derive the motion vectors of the sub-blocks based on the at least two first CPMVs by the affine model and predict each of the sub-blocks based on a corresponding one of the motion vectors. Then, the decoder module 124 may combine the predicted results of the sub-blocks to generate the first predicted block.

At block 350 of FIG. 3, the decoder module 124 determines a second predicted block of the block unit based on the second motion information.

In some implementations, with reference to FIG. 2, the second motion information may correspond to a merge index for selecting one of the regular merge candidates when the second motion information is determined from the inter merge candidate list. The decode module 124 may determine the motion vector and the reference frame based on the merge index and determine the second predicted block based on the reference frame and the motion vector.

In some implementations, the second motion information may be indicated by the MVP index when the second motion information is determined from the MVP candidate list. The decode module 124 may determine at least one motion vector based on the MVP index and/or the MVD, determine the at least one reference frame based on the at least one reference index, and determine the second predicted block based on the at least one reference frame and the at least one motion vector.

In some implementations, the second motion information may include the at least two second CPMVs derived based on the plurality of neighboring blocks when the second motion information is derived from one of the affine merge candidates and the affine MVP candidates. Thus, the second predicted block may be determined by predicting the sub-blocks based on the at least two second CPMVs by the affine model.

In some implementations, the decoder module 124 may select two prediction modes from the candidate modes in the candidate list. In the implementation, the first motion information and the second motion information may be respectively determined based on a corresponding one of the two prediction modes. In other words, the sub-block mode used to predict based on the affine model is selected as one of the two prediction modes, since the first motion information includes the at least two first CPMVs. Thus, one of the first predicted block and the second predicted block is generated based on the affine model.

At block 360 of FIG. 3, the decoder module 124 predicts the block unit by combining the first predicted block and the second predicted block based on the split line.

In some implementations, the block components in the first prediction area 441 may be predicted based on one of the first motion information and the second motion information, and the block components in the second prediction area 442 may be predicted based on the other one of the first motion information and the second motion information. In addition, the block components in the third prediction area 443 may be predicted based on both the first motion information and the second motion information. The block components in the third prediction area 443 may be predicted by deriving a plurality of first reference samples determined based on the first motion information and a plurality of second reference samples determined based on the second motion information and merging the first reference samples and the second reference samples based on a plurality of blending weights. In some implementations, the blending weights may be derived based on a plurality of component distances between the split line 420 and the block components in the third prediction area 443. The decoder module 124 generates a predicted block for the block unit by combining the predicted block components in the first prediction area 441, the predicted block components in the second prediction area 442, and the predicted block components in the third prediction area 443.

In some implementations, the summer 2244 of the decoder module 124 in the destination device 12 may add the predicted block into a plurality of residual components determined from the bitstream to reconstruct the block unit. In addition, the decoder module 124 may reconstruct all of the other block units in the image frame for reconstructing the image frame and the video.

In some implementations, when the method 300 is performed by the decoder module 124, the decoder module 124 may divide the block unit 400 into the sub-blocks 481-496 and predict each of the sub-blocks 481-496 by a sub-block prediction mode including the affine candidate list. The decoder module 124 may also divide the block unit 400 into the prediction areas 441-443 by the split line 420 and combine the predicted results of the prediction areas 441-443 by GPM. Thus, the method 300 may be regarded as a sub-block geometric partitioning mode (sbGPM).

Another method for decoding video data by an electronic device is shown according to an implementation of the present disclosure. This method is an example only, as there are a variety of ways to perform decoding of the video data. This method may be performed using the configurations illustrated in FIG. 1 and FIG. 2.

In some implementations, the video data may be a bitstream, and the bitstream may include a plurality of flags and a plurality of indices. The flags in the bitstream may include a plurality of prediction flags, and the indices in the bitstream may include a plurality of prediction indices.

With further reference to FIG. 1 and FIG. 2, the decoder module 124 may determine the one or more image frames from the bitstream and determine a first syntax structure corresponding to the one or more image frames.

The first syntax structure may be a parameter set including a plurality of first prediction indications and a plurality of first partitioning indications. The first syntax structure may be one of decoding capability information (DCI), operating point information (OPI), a video parameter set (VPS), a sequence parameter set (SPS), and a picture parameter set (PPS). For example, a first sbGPM enabled flag may be one of the first prediction indications included in the parameter set. In some implementations, when the first sbGPM enabled flag is included in the SPS, the first sbGPM enabled flag may be a flag sps_sbGPM_enabled_flag indicating whether the sbGPM is enabled to apply on the one or more image frames corresponding to the SPS.

When the first sbGPM enabled flag is equal to one, the one or more image frames corresponding to the first syntax structure may be enabled to be predicted by the sbGPM. Then, there may be a second sbGPM enabled flag included in a second syntax structure of the bitstream. In the implementation, a first syntax level of the first syntax structure may be higher than a second syntax level of the second syntax structure, and the second syntax structure may be another parameter set. For example, when the flag sps_sbGPM_enabled_flag of a video sequence is equal to one, there may be a flag pps_sbGPM_enabled_flag corresponding to a video picture in the video sequence and included in the bitstream.

When the first sbGPM enabled flag is equal to zero, the one or more image frames corresponding to the first syntax structure may be disabled from being predicted by the sbGPM. Thus, the second sbGPM enabled flag may be not included in the bitstream. When the second sbGPM enabled flag is not present in the bitstream, the second sbGPM enabled flag may be inferred to be equal to a predefined value. In some implementations, the predefined value may be equal to zero, so the one or more image frames corresponding to the second sbGPM enabled flag may be disabled from being predicted by the sbGPM. For example, when the flag sps_sbGPM_enabled_flag of the video sequence is equal to zero, the one or more image frames corresponding to the flag sps_sbGPM_enabled_flag are disabled from being predicted by the sbGPM. In addition, the flag pps sbGPM enabled flag corresponding to the video picture in the video sequence may not be included in the bitstream and inferred to be equal to zero, since the one or more image frames corresponding to the flag pps_sbGPM_enabled_flag are included in the one or more image frames corresponding to the flag sps_sbGPM_enabled_flag and predicted without considering the sbGPM.

With further reference to FIG. 1 and FIG. 2, the decoder module 124 may determine an image region in one of the image frames and determine a third syntax structure corresponding to the image region.

The third syntax structure may be a region header including a plurality of second prediction indications and a plurality of second partitioning indications. The third syntax structure may be one of a picture header (PH), a tile group header (TGH), a slice header (SH), and a tile header (TH). For example, a third sbGPM enabled flag may be one of the second prediction indications included in the region header. In some implementations, when the third sbGPM enabled flag is included in the PH, the third sbGPM enabled flag may be a flag ph_sbGPM_enabled_flag indicating whether the sbGPM is enabled to apply on the image region corresponding to the PH.

When the third sbGPM enabled flag is equal to one, the image region corresponding to the third syntax structure may be enabled to be predicted by the sbGPM. Then, there may be a fourth sbGPM enabled flag included in a fourth syntax structure of the bitstream. In some implementations, the second syntax level of the second syntax structure may be higher than a third syntax level of the third syntax structure, the third syntax level of the third syntax structure may be higher than a fourth syntax level of the fourth syntax structure, and the fourth syntax structure may be another region header. For example, when the flag ph_sbGPM_enabled_flag of a picture is equal to one, there may be a flag sh_sbGPM_enabled_flag corresponding to a slice in the picture and included in the bitstream.

When the third sbGPM enabled flag is equal to zero, the image region corresponding to the third syntax structure may be disabled from being predicted by the sbGPM. Thus, the fourth sbGPM enabled flag may be not included in the bitstream. When the fourth sbGPM enabled flag is not present in the bitstream, the fourth sbGPM enabled flag may be inferred to be equal to a predefined value. In some implementations, the predefined value may be equal to zero, so the image region corresponding to the fourth sbGPM enabled flag may be disabled from being predicted by the sbGPM. For example, when the flag ph_sbGPM_enabled_flag of the picture is equal to zero, the image region corresponding to the flag ph_sbGPM_enabled_flag is disabled from being predicted by the sbGPM. In addition, the flag sh_sbGPM_enabled_flag corresponding to the slice of the picture is not included in the bitstream and inferred to be equal to zero, since the image region corresponding to the flag sh_sbGPM_enabled_flag is included in the image region corresponding to the flag ph_sbGPM_enabled_flag and predicted without considering the sbGPM.

In some implementations, when the first sbGPM enabled flag is equal to zero, the image region included in one of the one or more image frames corresponding to the first syntax structure is disabled from being predicted by the sbGPM. Thus, the third sbGPM enabled flag corresponding to the image region is not present in the bitstream, and the third sbGPM enabled flag may be inferred to be equal to the predefined value. For example, when the flag pps sbGPM enabled flag is equal to zero, the image region included in one of the one or more image frames corresponding to the flag pps sbGPM enabled flag is also disabled from being predicted by the sbGPM. Thus, the flag sh_sbGPM_enabled_flag is not included in the bitstream and inferred to be equal to zero, since the image region corresponding to the flag sh_sbGPM_enabled_flag is included in the one or more image frames corresponding to the flag ph_sbGPM_enabled_flag and predicted without considering the sbGPM.

In some implementations, when the first sbGPM enabled flag is equal to one, the image region included in one of the one or more image frames corresponding to the first syntax structure may be enabled to be predicted by the sbGPM. Thus, the bitstream may include a present flag for indicating whether the third sbGPM enabled flag of the image region is included in the bitstream. For example, the present flag may be equal to one when the first sbGPM enabled flag corresponding to the one or more image frames is equal to one and at least one of a plurality of block units in one image region included in the one or more image frames is predicted by the sbGPM. In addition, the present flag may be equal to zero when the first sbGPM enabled flag corresponding to the one or more image frames is equal to one and all of the block units in the image region included in the one or more image frames are not predicted by the sbGPM.

In some implementations, the first sbGPM enabled flag may be replaced with a first sbGPM disabled flag for indicating whether the sbGPM is disabled. Thus, when the first sbGPM disabled flag is equal to zero, the sbGPM may be applied on the one or more image frames. In some implementations, the second sbGPM enabled flag may be replaced with a second sbGPM disabled flag for indicating whether the sbGPM is disabled. In some implementations, the third sbGPM enabled flag may be replaced with a third sbGPM disabled flag for indicating whether the sbGPM is disabled. In some implementations, the fourth sbGPM enabled flag may be replaced with a fourth sbGPM disabled flag for indicating whether the sbGPM is disabled.

With further reference to FIG. 1 and FIG. 2, the decoder module 124 may determine a block unit in one of the image regions in one of the image frames and determine a fifth syntax structure corresponding to the block unit.

The fifth syntax structure may be a block header including a plurality of third prediction indications and a plurality of third partitioning indications. The fifth syntax structure may be one of a coding unit header (CUH), a block header (BH), and a prediction unit header (PUH). For example, a sbGPM flag may be one of the third prediction indications included in the block header. In some implementations, when the sbGPM flag is included in the CUH, the sbGPM flag may be a flag sbGPM_flag indicating whether the sbGPM is applied on the block unit.

In some implementations, when the flag sbGPM_flag is equal to one, the sbGPM is applied on the block unit to predict the block unit. In addition, when the flag sbGPM_flag is not equal to one, a merge candidate mode may be applied on the block unit to predict the block unit. In some implementations, the merge candidate mode may be one of the GPM and other subblock merge modes. In addition, before the decoder module 124 checks the flag sbGPM flag to determine whether the sbGPM is applied on the block unit, the decoder module 124 may also determine a plurality of prediction flags.

In some implementations, before the decoder module 124 determines the flag sbGPM_flag, the decoder module 124 may further check a flag merge_subblock_flag for determining whether the bitstream includes the flag sbGPM_flag or other prediction flags. In the implementation, the prediction flags are used for determining which one of a plurality of block-based prediction modes is applied on the block unit. When the flag merge_subblock_flag is equal to one, the decoder module 124 may determine the flag sbGPM flag from the bitstream. In addition, when the flag sbGPM flag is equal to one, the decoder module 124 determines the sbGPM is applied on the block unit. When the flag sbGPM_flag is equal to zero, the decoder module 124 determines that other sub-block-based modes different from the sbGPM are applied on the block unit. For example, when the flag sbGPM flag is equal to zero, a subblock merge mode may be applied on the block unit. Furthermore, the decoder module 124 may further check the flag regular_merge_flag for determining whether the bitstream includes a flag mmvd_merge_flag or a flag ciip flag when the flag merge_subblock_flag is equal to zero. When the flag regular_merge_flag is equal to one, the flag mmvd_merge_flag may be included in the bitstream for determining whether a merge mode with motion vector difference (MMVD) or a regular merge mode is applied on the block unit. When the flag regular_merge_flag is equal to zero, the flag ciip flag may be included in the bitstream for determining whether a combined inter-picture merge and intra-picture prediction (CIIP) mode or the GPM is applied on the block unit.

In some implementations, before the decoder module 124 determines the flag sbGPM_flag, the decoder module 124 may further check a flag merge_subblock_flag, a flag regular_merge_flag, and a flag ciip flag. When the flag merge_subblock_flag is equal to one, the decoder module 124 may determine that the subblock merge mode is applied on the block unit. In addition, the decoder module 124 may further check the flag regular_merge_flag for determining whether the bitstream includes a flag mmvd_merge_flag or a flag ciip flag when the flag merge_subblock_flag is equal to zero. When the flag regular_merge_flag is equal to one, the flag mmvd_merge_flag may be included in the bitstream for determining whether a merge mode with motion vector difference (MMVD) or a regular merge mode is applied on the block unit. When the flag regular_merge_flag is equal to zero, the decoder module 124 may further check the flag ciip flag for determining whether the bitstream includes the flag sbGPM_flag or the CIIP mode is applied on the block unit. When the flag ciip flag is equal to one, the CEP mode is applied on the block unit. When the flag ciip flag is equal to zero, the flag sbGPM_flag may be included in the bitstream for determining whether the GPM or the sbGPM is applied on the block unit. In other words, the flag ciip flag may be determined from the video data as a prediction mode flag for indicating whether the GPM including a block-based GPM and a sub-block-based GPM is applied on the block unit. In addition, the prediction mode flag is also used for determining whether the sbGPM flag regarded as a block flag is included in the video data, and the block flag is determined for indicating whether the sub-block-based GPM (sbGPM) different from the block-based GPM is applied on the block unit.

In some implementations, the flag merge_subblock_flag may be replaced with a flag merge_non_subblock_flag for indicating whether a block-based prediction mode or a sub-block-based prediction mode is applied on the block unit. Thus, when the flag merge_non_subblock_flag is equal to zero, the sub-block-based prediction mode may be applied on the block unit. In addition, the flag sbGPM_flag may be replaced with a flag non sbGPM flag for indicating whether the sbGPM_flag is applied on the block unit. Thus, when the flag non sbGPM flag is equal to zero, the sbGPM may be applied on the block unit. In other words, the flag merge_subblock_flag may be determined from the video data as a sub-block flag for indicating whether a sub-block merge mode including the sbGPM is applied on the block unit. In addition, the sub-block flag is also used for determining whether the sbGPM flag regarded as the sub-block GPM flag is included in the video data, and the sub-block GPM flag is determined for indicating whether the sbGPM is applied on the block unit.

In some implementations, in order to remove the signaling redundancy or reduce the codec complexity, a plurality of restrictions each including a plurality of conditions may be introduced to restrict the syntax signaling of a block level syntax. In some implementations, the block level syntax may be included in the fifth syntax structure. Thus, the information of neighboring blocks may be used to remove the signaling redundancy.

Table 1 schematically shows exemplary implementations of the restrictions. In some implementations, an availability condition availableX may be an availability checking result of one neighboring block and a condition CondX may be a condition checking result of one neighboring block. When the neighboring block is located to the left side of the block unit, the availability condition availableX may be regarded as availableL and the condition Cond may be regarded as CondL. When the neighboring block is located above the block unit, the availability condition availableX may be regarded as availableA and the condition CondX may be regarded as CondA. In addition, the operator "x y" is a Boolean logical "or" of x and y and the operator "x && y" is a Boolean logical "and" of x and y.

TABLE 1

| Usage of the neighboring blocks | Restrictions |
| --- | --- |
| Only one of the left block or the above block is used | condL && availableL<br>condA && availableA |
| Both left block and above block are used | ( condL && availableL ) \|\|<br>( condA && availableA )<br>( condL && availableL ) &&<br>( condA && availableA ) |

Table 2 schematically shows exemplary implementations of the conditions determined based on the information of the neighboring blocks. The array indices xNbX, yNbX indicate the luma location (xNbX, yNbX) covered by a neighbor block (X=L or A) relative to the top-left luma sample of the picture.

TABLE 2

| Prediction mode of the neighboring blocks | CondX |
| --- | --- |
| blockX is predicted based on an affine model | e.g. InterAffineFlag[ xNbX ][ yNbX ] |
| blockX is predicted based on a subblock-based mode (including subblock-based temporal motion vector prediction, affine mode, SbGPM, etc.) | e.g. MergeSubblockFlag[ xNbX ][ yNbX ] |
| blockX is predicted based on a geometric-based mode (including GPM, SbGPM, Intra subblock prediction, etc.) | e.g. MergeGpmFlag[ xNbX ][ yNbX ], |

Figure 5:
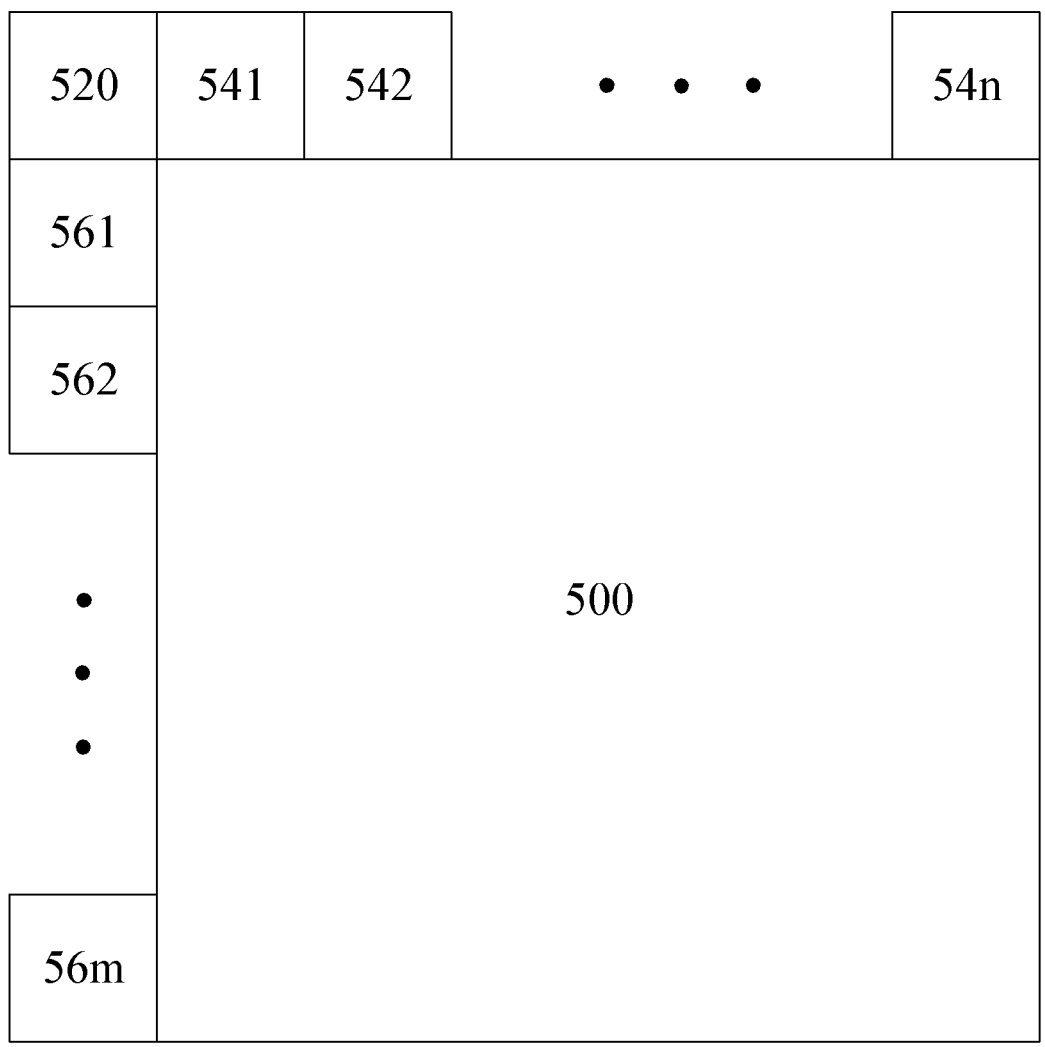
FIG. 5 is a schematic illustration of a block unit and a plurality of neighboring blocks according to an implementation of the present disclosure.

FIG. 5 is a schematic illustration of a block unit and a plurality of neighboring blocks according to an implementation of the present disclosure. In some implementations, the neighboring blocks 520, 541-54*n*, and 561-56*m* neighbor the block unit 500. In the implementation, the numbers n and m may be integers determined based on a block size of the block unit 500 and a plurality of neighboring sizes of the neighboring blocks 520, 541-54*n*, and 561-56, and the number n may be different from or equal to the number m. The neighboring blocks 520 and 541-54*n* are located above the block unit 500, and the neighboring blocks 520 and 561-56*m* are located to the left side of the block unit 500. When the neighboring block blockX is one of the neighboring blocks 520 and 541-54*n*, blockX may be regarded as blockA. In addition, when the neighboring block blockX is one of the neighboring blocks 520 and 561-56*m*, blockX may be regarded as blockL.

Table 3 schematically shows an exemplary implementation of syntax structure including the restrictions for the decoder module 124 to decode the video data. In some implementations, before the decoder module 124 parses the sbGPM flag, the decoder module 124 may further check the restrictions for determining whether the sbGPM flag is included in the bitstream.

TABLE 3

```
merge_subblock_flag[ x0 ][ y0 ]                                          ae(v)
if( merge_subblock_flag[ x0 ][ y0 ] = = 1 ) {
    if (availableL && MergeSubblockFlag[ xNbL ][ yNbL ] ||
availableA && MergeSubblockFlag[ xNbA ][ yNbA ]
...(other conditions) )
    sbGPM_flag[ x0 ][ y0 ]                                                ae(v)
    ...
}
```

Table 4 schematically shows an exemplary implementation of VTM including the restrictions for decoding or encoding the video data.

```
if (pu.cu->affine)
{
    const CodingUnit* cuLeft = pu.cs->getCURestricted(cu.lumaPos( ).offset(-1, 0), cu, CH_L);
    const CodingUnit* cuAbove = pu.cs->getCURestricted(cu.lumaPos( ).offset(0, -1), cu, CH_L);
    const bool geoAvailable = pu.cu->cs->slice->getSPS( )->getUseGeo( ) && pu.cu->cs->slice->
isInterB( ) && ((cuLeft && cuLeft->affine) || (cuAbove && cuAbove->affine))
&& pu.cs->sps->getMaxNumGeoCand( ) > 1
&& pu.cu->lwidth( ) >= GEO_MIN_CU_SIZE && pu.cu->lheight( ) >= GEO_MIN_CU_SIZE
&& pu.cu->lwidth( ) <= GEO_MAX_CU_SIZE && pu.cu->lheight( ) <= GEO_MAX_CU_SIZE
&& pu.cu->lwidth( ) < 8 * pu.cu->lheight( ) && pu.cu->lheight( ) < 8 * pu.cu->lwidth( );
    if (geoAvailable)
    {
#if FGI_AFFINE_GEO && FGI_AFFINE_GEO_SYNTAX_A_CTX
        pu.cu->geoFlag = m_BinDecoder.decodeBin( Ctx::AffGeoFlag( ) );
#else
        pu.cu->geoFlag = m_BinDecoder.decodeBinEP( );
#endif
    }
#endif
...
```

Figure 6:
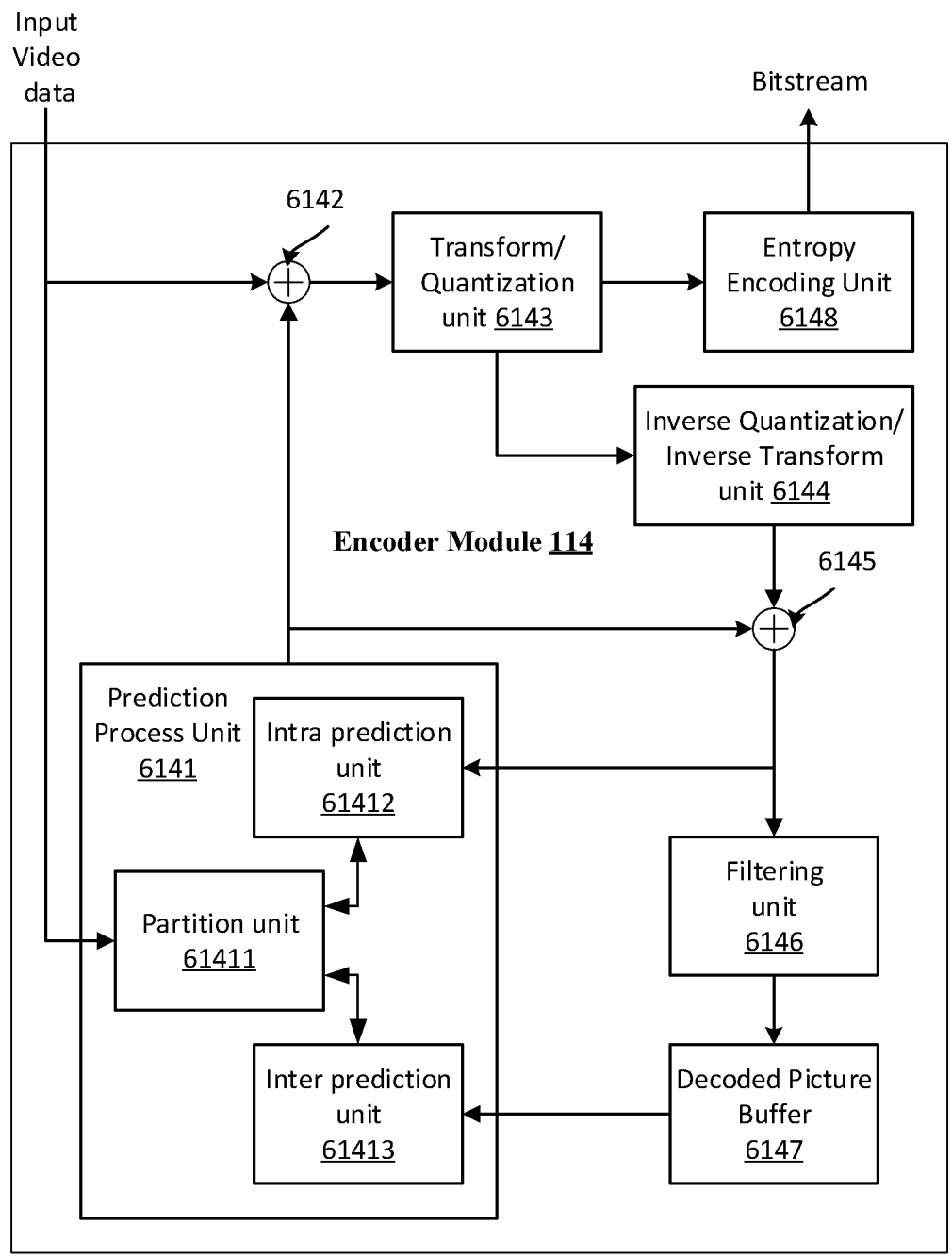
FIG. 6 illustrates a block diagram of the encoder module of the first electronic device illustrated in FIG. 1 according to an implementation of the present disclosure.

FIG. 6 illustrates a block diagram of the encoder module 114 of the first electronic device 110 illustrated in FIG. 1 according to an implementation of the present disclosure. The encoder module 114 may include a prediction processor (e.g., prediction process unit 6141), at least a first summer (e.g., first summer 6142) and a second summer (e.g., second summer 6145), a transform/quantization processor (e.g., transform/quantization unit 6143), an inverse quantization/inverse transform processor (e.g., inverse quantization/inverse transform unit 6144), a filter (e.g., filtering unit 6146), a decoded picture buffer (e.g., decoded picture buffer 6147), and an entropy encoder (e.g., entropy encoding unit 6148). The prediction process unit 6141 of the encoder module 114 may further include a partition processor (e.g., partition unit 61411), an intra prediction processor (e.g., intra prediction unit 61412), and an inter prediction processor (e.g., inter prediction unit 61413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

The prediction process unit 6141 may select one of the coding results generated by the intra prediction unit 61412 and the inter prediction unit 61413 based on a mode selection method, such as a cost function. The mode selection method may be a rate-distortion optimization (RDO) process.

The prediction process unit 6141 may determine the selected coding result and provide a predicted block corresponding to the selected coding result to the first summer 6142 for generating a residual block and to the second summer 6145 for reconstructing the encoded block unit. The prediction process unit 6141 may further provide syntax elements such as motion vectors, intra mode indicators, partition information, and other syntax information to the entropy encoding unit 6148.

The intra prediction unit 61412 may intra predict the current block unit. The intra prediction unit 61412 may determine an intra prediction mode directed toward a reconstructed sample neighboring the current block unit in order to encode the current block unit.

The intra prediction unit 61412 may encode the current block unit using various intra prediction modes. The intra prediction unit 61412 of the prediction process unit 6141 may select an appropriate intra prediction mode from the selected modes. The intra prediction unit 61412 may encode the current block unit using a cross component prediction mode to predict one of the two chroma components of the current block unit based on the luma components of the current block unit. The intra prediction unit 61412 may predict a first one of the two chroma components of the current block unit based on the second of the two chroma components of the current block unit.

The inter prediction unit 61413 may inter predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

The first summer 6142 may generate the residual block by subtracting the prediction block determined by the prediction process unit 6141 from the original current block unit. The first summer 6142 may represent the component or components that perform this subtraction.

The transform/quantization unit 6143 may apply a transform to the residual block in order to generate a residual transform coefficient and then quantize the residual transform coefficients to further reduce bit rate. The transform may be one of a DCT, DST, AMT, MDNS ST, HyGT, signal dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 6143 may perform a scan of the matrix including the quantized transform coefficients. Alternatively, the entropy encoding unit 6148 may perform the scan.

The entropy encoding unit 6148 may receive a plurality of syntax elements from the prediction process unit 6141 and the transform/quantization unit 6143 including a quantization parameter, transform data, motion vectors, intra modes, partition information, and other syntax information. The entropy encoding unit 6148 may encode the syntax elements into the bitstream.

The entropy encoding unit 6148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 in FIG. 1) or archived for later transmission or retrieval.

The inverse quantization/inverse transform unit 6144 may apply inverse quantization and inverse transformation to reconstruct the residual block in the pixel domain for later use as a reference block. The second summer 6145 may add the reconstructed residual block to the prediction block provided from the prediction process unit 6141 in order to produce a reconstructed block for storage in the decoded picture buffer 6147.

The filtering unit 6146 may include a deblocking filter, a SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 6145.

The decoded picture buffer 6147 may be a reference picture memory that stores the reference block for use by the encoder module 114 to encode video, such as in intra or inter coding modes. The decoded picture buffer 6147 may include a variety of memory devices such as DRAM, including SDRAM, MRAM, RRAM, or other types of memory devices. The decoded picture buffer 6147 may be on-chip with other components of the encoder module 114 or off-chip relative to those components.

In some implementations, the encoder module 114 may perform the method 300 for encoding video data and predicting a block unit as illustrated in FIG. 3. The method 300 may be performed using the configurations illustrated in FIG. 1 and FIG. 6, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or less blocks may be utilized without departing from the present disclosure.

At block 310, the encoder module 114 determines a block unit from an image frame according to video data. In some implementations, the video data received by the encoder module 114 may be a video. With reference to FIGS. 1 and 6, the first electronic device 110 may receive the video via the source module 112. The encoder module 114 may determine the image frame from the video.

At block 320 of FIG. 3, the encoder module 114 determines a split line of the block unit according to video data. In some implementations, with reference to FIG. 1, FIGS. 4(*a*) and 4(*b*), and FIG. 6, the encoder module 114 may divide the block unit 400 into a plurality of prediction areas 441-443 based on the split line 420 of the block unit 400.

In some implementations, the split line may be indicated by a partition index for providing to the encoder module 114. In some implementations, the partition index may indicate a partition angle index and a partition distance index when the partition index is a geometric partition index. The partition angle index may indicate a split angle of the split line, and the partition distance index may indicate a split distance between the split line and a center point of the block unit. Thus, the encoder module 114 may determine the split line based on the split angle and the split distance indicated by the partition index when the encoder module 114 receives the partition index from the encoder module 114.

At block 330 of FIG. 3, the encoder module 114 determines first motion information and second motion information according to the video data.

In some implementations, with reference to FIG. 1, FIGS. 4(*a*) and 4(*b*), and FIG. 6, the encoder module 114 may divide the block unit 400 into the plurality of prediction areas 441-443 based on the split line 420 of the block unit 400 and determine the first motion information and the second motion information for predicting the plurality of prediction areas 441-443.

In some implementations, the prediction indications may include a first motion candidate index and a second motion candidate index. In addition, the first motion candidate index and the second motion candidate index may be generated for adding into the bitstream. In some implementations, the first motion candidate index may indicate the first motion information in a candidate list having a plurality of candidate modes, and the second motion candidate index may indicate the second motion information in the candidate list. In some implementations, the candidate list includes at least one of an affine candidate list, an inter merge candidate list, and a motion vector prediction (MVP) candidate list. In some implementations, the affine candidate list may include at least one of a plurality of affine merge candidates and a plurality of affine MVP candidates.

In some implementations, the candidate list may be the affine candidate list only including at least one of the plurality of affine merge candidates and the plurality of affine motion vector prediction candidates.

In some implementations, the first motion information and the second motion information may be derived from the affine candidate list, the inter merge candidate list, and the MVP candidate list. When the first motion information is determined from the affine candidate list, the first motion information includes the at least two first CPMVs derived based on the neighboring blocks neighboring the block unit. In addition, when the second motion information is determined from the affine candidate list, the second motion information includes at least two second CPMVs derived based on the neighboring blocks neighboring the block unit.

In some implementations, the encoder module 114 may select the first information and the second information based on a candidate selection method, such as a cost function. The candidate selection method may be a sum of absolute differences (SAD) process, a sum of absolute transformed differences (SATD), or the RDO cost process. The SAD process may be calculated by taking the absolute difference between the block unit and a prediction block of the block unit generated based on the first information and the second information. The SATD process may be calculated by taking a Hadamard transform of the difference between the block unit and a prediction block of the block unit generated based on the first information and the second information. The RDO cost process may be calculated based on the block unit and the prediction block of the block unit generated based on the first information and the second information. At block 340 of FIG. 3, the encoder module 114 determines a first predicted block of the block unit based on an affine model.

In some implementations, the first motion information is determined from one of the affine merge candidates and the affine MVP candidates since the first motion information includes the at least two first CPMVs. Thus, the first predicted block may be predicted by a four-parameter affine motion model or a six-parameter affine motion model.

In some implementations, with reference to FIG. 4(d) and FIG. 6, the encoder module 114 may divide the block unit 400 into the sub-blocks 481-496. The motion vectors of the sub-blocks may be derived by the four-parameter affine motion model or the six-affine motion model. Thus, the encoder module 114 may derive the motion vectors of the sub-blocks based on the at least two first CPMVs and predict each of the sub-blocks based on a corresponding one of the motion vectors. Then, the encoder module 114 may combine the predicted results of the sub-blocks to generate the first predicted block.

At block 350 of FIG. 3, the encoder module 114 determines a second predicted block of the block unit based on the second motion information.

In some implementations, with reference to FIG. 6, the second motion information may be selected from the candidate list. When the second motion information is determined from the inter merge candidate list and the MVP candidate list, the encoder module 114 directly predict the block unit based on the second motion information to determine the second predicted block.

In some implementations, the second motion information may include the at least two second CPMVs, when the second motion information is derived from one of the affine merge candidates and the affine MVP candidates. Thus, the second predicted block may be determined by predicting the sub-blocks based on the second motion information.

At block 360 of FIG. 3, the encoder module 114 predicts the block unit by combining the first predicted block and the second predicted block based on the split line.

In some implementations, the block components in the first prediction area 441 and the second prediction area 442 may be respectively predicted based on one of the first motion information and the second motion information. In addition, the block components in the third prediction area 443 may be predicted by deriving a plurality of first reference samples determined based on the first motion information and a plurality of second reference samples determined based on the second motion information and merging the first reference samples and the second reference samples based on a plurality of blending weights. The encoder module 114 generates a predicted block for the block unit by combining the predicted block components in the first prediction area 441, the second prediction area 442, and the third prediction area 443.

In some implementations, the block unit may include a plurality of block elements. In some implementations, the encoder module 114 may determine a plurality of residual components by subtracting the combined block from the block elements and provide the bitstream including a plurality of coefficients corresponding to the residual components. The encoder module 114 may return the residual components based on the coefficients and add the returned residual components into the combined block to generate a reconstructed block unit.

Furthermore, the encoder module 114 may signal a plurality of prediction flags and a plurality of prediction indices for indicating whether or not the sbGPM is enabled and whether or not the sbGPM is applied on the block unit when the sbGPM is enabled and for indicating the split line, the first motion information, and the second motion information when the sbGPM is applied on the block unit, and add the prediction flags and the prediction indices into the bitstream. The prediction flags may include at least one of the first sbGPM enabled flag, the second sbGPM enabled flag, the third sbGPM enabled flag, the fourth sbGPM enabled flag, the sbGPM flag, the flag merge_subblock_flag, the flag regular_merge_flag, the flag mmvd_merge_flag, and the flag ciip flag. Thus, the decoder module 124 may determine the prediction flags from the bitstream for determining the prediction mode of the block unit.

In some implementations, in order to remove the signaling redundancy or reduce the codec complexity, a plurality of restrictions each including a plurality of conditions may be introduced to restrict the syntax signaling of a block level syntax. In some implementations, the block level syntax may be included in the fifth syntax structure. Thus, the information of neighboring blocks may be used to remove the signaling redundancy.

In some implementations, the restrictions and the conditions in Table 1 and Table 2 may be applied in the encoder module 114 for removing the signaling redundancy or reducing the codec complexity. In addition, Table 3 also shows an exemplary implementation of syntax structure including the restrictions for the decoder module 124 to decode the video data. In addition, the other restrictions and the conditions in Table 1 and Table 2 may be arbitrarily combined to remove the signaling redundancy or reduce the codec complexity.

The disclosed implementations are to be considered in all respects as illustrative and not restrictive. It should also be understood that the present disclosure is not limited to the specific disclosed implementations but that many rearrangements, modifications, and substitutions are possible without departing from the scope of the present disclosure.

What is claimed is:

1. A method of decoding video data performed by an electronic device, the method comprising:
   determining, based on the video data, a block unit from an image frame;
   determining, based on the video data, a split line of the block unit;
   determining, based on the video data, first motion information and second motion information;
   determining a first predicted block of the block unit based on the first motion information using an affine model, wherein:
      the first motion information includes at least two first control point motion vectors (CPMVs),
      the block unit is divided into a plurality of sub-blocks,
      the plurality of sub-blocks is predicted based on the at least two first CPMVs using the affine model, and
      the first predicted block of the block unit is determined based on the predicted plurality of sub-blocks;
   determining a second predicted block of the block unit based on the second motion information; and
   predicting the block unit by combining the first predicted block and the second predicted block using the split line.

2. The method according to claim 1, wherein:
   the first motion information and the second motion information are determined from a candidate list including at least one of an affine candidate list, an inter merge candidate list, and a motion vector prediction (MVP) candidate list; list,
   the affine candidate list includes at least one of a plurality of affine merge candidates and a plurality of affine motion vector prediction candidates, each of the plurality of affine merge candidates and the plurality of affine motion vector prediction candidates being used to predict the block unit based on the affine model; model,
   the inter merge candidate list includes at least one of a plurality of regular merge candidates, and
   the MVP candidate list includes at least one of a plurality of MVP candidates.

3. The method according to claim 1, wherein the first motion information and the second motion information are determined from a candidate list including only an affine candidate list that has at least one of a plurality of affine merge candidates and a plurality of affine motion vector prediction candidates, each of the plurality of affine merge candidates and the plurality of affine motion vector prediction candidates being used to predict the block unit based on the affine model.

4. The method according to claim 1, wherein:
   the at least two first CPMVs are derived based on a plurality of neighboring blocks neighboring the block unit.

5. The method according to claim 4, wherein:
   the second motion information includes at least two second CPMVs derived based on the plurality of neighboring blocks, and
   the second predicted block of the block unit is determined by predicting the plurality of sub-blocks based on the at least two second CPMVs using the affine model.

6. The method according to claim 1, further comprising:
   determining, from the video data, that a prediction mode flag, indicating a geometric prediction mode (GPM), is applied on the block unit;
   determining, based on the prediction mode flag, whether a block flag is included in the video data; and
   determining, based on the block flag, whether a sub-block GPM including an affine candidate list is applied on the block unit.

7. The method according to claim 1, further comprising:
   determining, from the video data, that a sub-block flag, indicating a sub-block merge mode, is applied on the block unit;
   determining, based on the sub-block flag, whether a sub-block geometric prediction mode (GPM) flag is included in the video data; and
   determining, based on the sub-block GPM flag, whether a sub-block GPM is applied on the block unit.

8. An electronic device for decoding video data, the electronic device comprising:
   at least one processor; and
   one or more non-transitory computer-readable media coupled to the at least one processor and storing one or more computer-executable instructions which, when executed by the at least one processor, cause the electronic device to:
      determine, based on the video data, a block unit from an image frame;
      determine, based on the video data, a split line of the block unit;
      determine, based on the video data, first motion information and second motion information;
      determine a first predicted block of the block unit based on the first motion information using an affine model, wherein:
         the first motion information includes at least two first control point motion vectors (CPMVs),
         the block unit is divided into a plurality of sub-blocks,
         the plurality of sub-blocks is predicted based on the at least two first CPMVs using the affine model, and
         the first predicted block of the block unit is determined based on the predicted plurality of sub-blocks;
      determine a second predicted block of the block unit based on the second motion information; and
      predict the block unit by combining the first predicted block and the second predicted block using the split line.

9. The electronic device according to claim 8, wherein:
   the first motion information and the second motion information are determined from a candidate list including at least one of an affine candidate list, an inter merge candidate list, and a motion vector prediction (MVP) candidate list,
   the affine candidate list includes at least one of a plurality of affine merge candidates and a plurality of affine motion vector prediction candidates, each of the plurality of affine merge candidates and the plurality of affine motion vector prediction candidates being used to predict the block unit based on the affine model,
   the inter merge candidate list includes at least one of a plurality of regular merge candidates, and
   the MVP candidate list includes at least one of a plurality of MVP candidates.

10. The electronic device according to claim 8, wherein the first motion information and the second motion information are determined from a candidate list including only an affine candidate list that has at least one of a plurality of affine merge candidates and a plurality of affine motion vector prediction candidates, each of the plurality of affine merge candidates and the plurality of affine motion vector prediction candidates being used to predict the block unit based on the affine model.

11. The electronic device according to claim 8, wherein:
the at least two first CPMVs are derived based on a plurality of neighboring blocks neighboring the block unit.

12. The electronic device according to claim 11, wherein:
the second motion information includes at least two second CPMVs derived based on the plurality of neighboring blocks, and
the second predicted block of the block unit is determined by predicting the plurality of sub-blocks based on the at least two second CPMVs using the affine model.

13. The electronic device according to claim 8, wherein the one or more computer-executable instructions, when executed by the at least one processor, further cause the electronic device to:
determine, from the video data, that a prediction mode flag, indicating a geometric prediction mode (GPM), is applied on the block unit;
determine, based on the prediction mode flag, whether a block flag is included in the video data; and
determine, based on the block flag, whether a sub-block GPM including an affine candidate list is applied on the block unit.

14. The electronic device according to claim 8, wherein the one or more computer-executable instructions, when executed by the at least one processor, further cause the electronic device to:
determining, from the video data, that a sub-block flag, indicating a sub-block merge mode, is applied on the block unit;
determining, based on the sub-block flag, whether a sub-block geometric prediction mode (GPM) flag is included in the video data; and
determining, based on the sub-block GPM flag, whether a sub-block GPM is applied on the block unit.

15. A method of decoding video data by an electronic device, the method comprising:
determining, based on the video data, a block unit from an image frame;
determining, based on the video data, a split line of the block unit;
determining a plurality of candidate modes including a sub-block mode using an affine model;
selecting two prediction modes from the plurality of candidate modes;
determining two predicted blocks based on the two prediction modes, wherein:
the block unit is divided into a plurality of sub-blocks,
the plurality of sub-blocks is predicted to generate one of the two predicted blocks, and
the plurality of sub-blocks is predicted based on at least two first control point motion vectors (CPMVs) using the affine model when the sub-block mode is selected as one of the two prediction modes; and
predicting the block unit by combining the two predicted blocks based on the split line.

16. The method according to claim 15, wherein:
the plurality of candidate modes is included in a candidate list,
the candidate list includes at least one of an affine candidate list, an inter merge candidate list, and a motion vector prediction (MVP) candidate list,
the sub-block mode is included in the affine candidate list,
the inter merge candidate list includes at least one of a plurality of regular merge candidates; and
the MVP candidate list includes at least one of a plurality of MVP candidates.

17. The method according to claim 16, wherein the affine candidate list includes at least one of a plurality of affine merge candidates and a plurality of affine motion vector prediction candidates, each of the plurality of affine merge candidates and the plurality of affine motion vector prediction candidates being used to predict the block unit based on the affine model.

18. The method according to claim 15, wherein:
the sub-block mode includes the at least two first CPMVs derived based on a plurality of neighboring blocks neighboring the block unit.

19. The method according to claim 15, further comprising:
determining, from the video data, that a prediction mode flag, indicating a geometric prediction mode (GPM), is applied on the block unit;
determining, based on the prediction mode flag, whether a block flag is included in the video data; and
determining, based on the block flag, whether the sub-block mode is included in the plurality of candidate modes.

20. The method according to claim 15, further comprising:
determining, from the video data, that a sub-block flag, indicating a sub-block merge mode, is applied on the block unit;
determining, based on the sub-block flag, whether a sub-block geometric prediction mode (GPM) flag is included in the video data; and
determining, based on the sub-block GPM flag, whether the sub-block mode is included in the plurality of candidate modes, wherein the sub-block mode is a sub-block GPM.

* * * * *